(12) United States Patent
Toutonghi (10) Patent No.: US 7,600,031 B2
(45) Date of Patent: Oct. 6, 2009

(54) SHARING DIGITAL CONTENT VIA A PACKET-SWITCHED NETWORK

(75) Inventor: Michael J Toutonghi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 566 days.

(21) Appl. No.: 11/414,686

(22) Filed: Apr. 27, 2006

(65) Prior Publication Data

US 2007/0255853 A1 Nov. 1, 2007

(51) Int. Cl.
*G06F 15/16* (2006.01)
(52) U.S. Cl. ............... 709/230; 709/202; 709/203; 709/217; 709/219; 709/238; 709/246; 709/247; 382/232
(58) Field of Classification Search .......... 709/202, 709/203, 217, 219, 230, 28, 246, 247, 238; 382/232
See application file for complete search history.

(56) References Cited

U.S. PATENT DOCUMENTS

| | | | | |
|---|---|---|---|---|
| 2002/0107988 A1* | 8/2002 | Jordan | | 709/247 |
| 2003/0193025 A1* | 10/2003 | Takagi | | 250/310 |
| 2003/0225626 A1* | 12/2003 | Sanders | | 705/26 |
| 2005/0001024 A1* | 1/2005 | Kusaka et al. | | 235/375 |
| 2005/0038876 A1* | 2/2005 | Chaudhuri | | 709/219 |
| 2005/0249420 A1* | 11/2005 | Takahashi | | 382/232 |
| 2006/0041634 A1* | 2/2006 | Kaneko et al. | | 709/217 |
| 2006/0080740 A1* | 4/2006 | Bremer et al. | | 726/26 |

* cited by examiner

Primary Examiner—Liangche A Wang
(74) Attorney, Agent, or Firm—Workman Nydegger (57) ABSTRACT

In one aspect, the invention provides a method for sharing content. The method is performed by a data acquisition device and comprises upon encountering a content transfer condition, if a size of content is greater than a predefined size threshold then performing a lossy compression operation on the content to reduce the size of the content to produce lossy-compressed content, and transmitting the lossy-compressed content to a predefined destination for routing to a final storage location using a packet-switched networking protocol; and at a later time, performing a synchronization operation wherein the non-lossy compressed content is transmitted to the final storage location.

20 Claims, 7 Drawing Sheets

SHARING DIGITAL CONTENT VIA A PACKET-SWITCHED NETWORK

FIELD OF THE INVENTION

Embodiments of the invention relate to organizing and sharing digital content.

BACKGROUND

Today, increasingly there is a trend towards packing more features into the digital cameras of camera-enabled mobile phones and toward increasing the resolution and quality of such cameras. The result is that the people are taking more pictures with such cameras. The pictures taken with such cameras are typically stored on the mobile phone only temporarily as they are often moved from the camera to a remote storage location either on a user device such as a personal computer or on a server. Conveniently, the images may also be organized or categorized into collections as is described in co-pending U.S. patent application Ser. No. 11/302,566, which is hereby incorporated by reference. For example an image may be categorized into one or more named collections such for example a "2006 European Vacation" collection, a "My Children's Photos" collection, etc. to facilitate easy retrieval.

Co-pending U.S. patent application Ser. No. 10/817,599, which is hereby incorporated by reference discloses techniques to conveniently move the images from the mobile phone to their final storage location.

Besides images, other forms of digital content may be generated on a devices such as mobile phones, Pocket PCs, Personal Digital Assistants (PDAs), etc. Such content may include voice data, text documents, slides, etc. These other forms of digital content can also be categorized and moved to their final storage location using the techniques disclosed in U.S. patent application Ser. Nos. 11/302,566 and 10/817,599.

Apart from personal use of digital content, increasingly the digital content is shared, for example, with friends, family, co-workers etc.

SUMMARY OF THE INVENTION

In one aspect, the invention provides a method for sharing content. The method is performed by a data acquisition device and comprises upon encountering a content transfer condition, if a size of content is greater than a predefined size threshold then performing a lossy compression operation on the content to reduce the size of the content to produce lossy-compressed content, and transmitting the lossy-compressed content to a predefined destination for routing to a final storage location using a packet-switched networking protocol; and at a later time, performing a synchronization operation wherein the non-lossy compressed content is transmitted to the final storage location.

Other aspects of the invention will be apparent from the detailed description below.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In one embodiment, a method is provided for a data acquisition device (DAD) to share content with devices (hereinafter referred to as "destination devices"). Examples of DADs include mobile telephones, pocket personal computers (PCs), Personal Digital Assistants (PDAs), etc. A destination device may be a server, a desktop PC, a mobile device such as a DAD, etc. If a user of a DAD wishes to share content with a destination device, the content may be transmitted to the destination device using an over-the air (OTA) data connection with the destination device. The OTA data connection is a dedicated channel formed using a circuit-switched network. Charges associated with the use of the OTA data connection are high, particularly when the DAD is located within a non-local or roaming network.

Advantageously, in accordance with the sharing method of the present invention, the DAD sends a lossy compressed-version of the content to the destination device using a packet-switched network. For example, the lossy-compressed content may be sent as a multimedia messaging service (MMS) message to a predefined destination. In one embodiment, the predefined destination comprises a server for a Content Management Service (CMS). Metadata to control processing of the content by the CMS is also sent to the server. Based on the metadata, the CMS routes the lossy-compressed content to selected invitees and to a final storage location for the content. At a later time, the DAD performs a synchronization operation wherein the original content (i.e. the non lossy-compressed content) is sent to the final storage location, for example using a OTA data connection provided that that DAD is in its local network, or a non-OTA data connection such as a Bluetooth connection or a Wi-Fi connection, as will be described.

Figure 1:
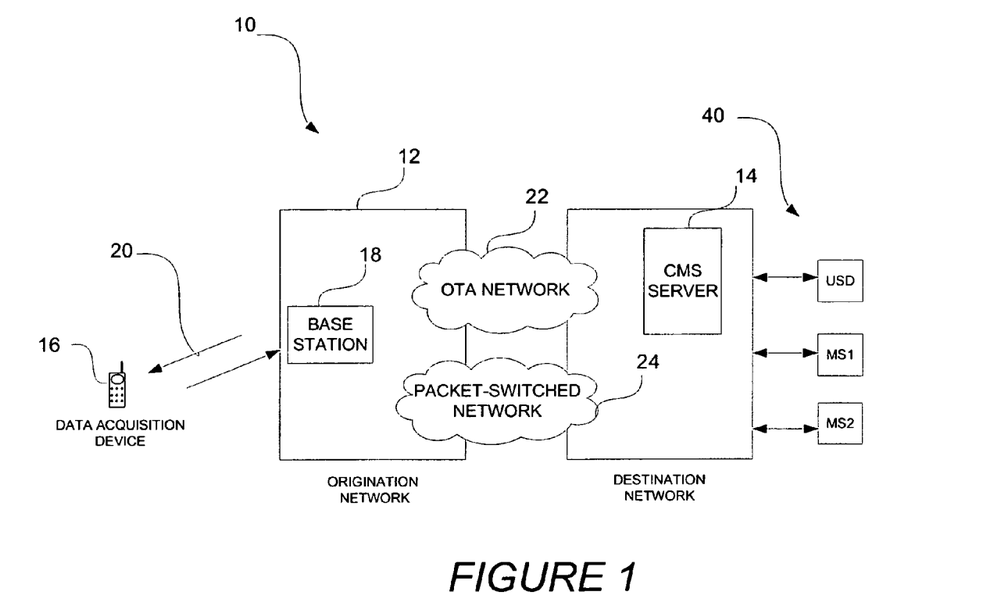
FIG. 1 shows a high-level block diagram of a communications system in accordance with one embodiment of the invention.

Turning now to FIG. 1 of the drawings, there is shown a communication system 10 in accordance with one embodiment of the invention. The communication system 10 includes an origination network 12 and a destination network 14. Within the origination network 12, origination devices in the form of DADs (only one DAD 16 is shown in FIG. 1) communicate with a base station 18 of the origination network 12 through wireless communication channels 20. At least a portion of the origination network 12 includes a wireless communication system which may be any cellular, radio, optical, or other wireless system that facilitates the wireless exchange of signals with the DAD 16. Examples of suitable wireless communication systems include cellular telephone systems operating in accordance with Code Division Multiple Access (CDMA) or Global System for Mobile Communication (GSM) standards. The base station 18 is connected to an OTA communications network 22 that routes wireless communications, e.g. telephone calls, in accordance with known techniques. The OTA communications network 22 includes a combination of routing and/or switching equipment, communication links, and other infrastructure suitable for establishing an OTA communications link between the base station 18 and a Content Management (CMS) server 24 in the destination network 14. The OTA communications network 22 is a circuit-switched network and includes mobile switching center (MSC), switches, and transmission equipment among other hardware and software that facilitates establishing a dedicated communication link between the base station 18 and the CMS server 24. The cloud representing the OTA communications network 22 in the FIG. 1 overlaps the origination network 12 and the destination network 14 to illustrate that components within the origination network 12 and the destination network 14 can be considered as part of the OTA communications network 22. Further, some of the equipment and infrastructure used to establish communication through the OTA communications network 22 may be utilized by the packet data messaging system described below.

Figure 2:
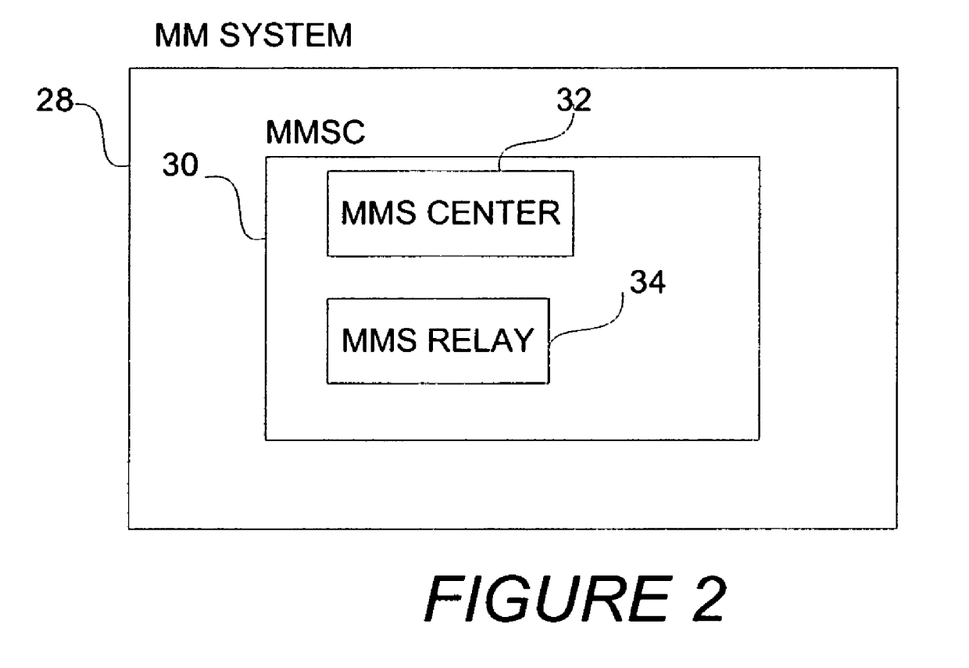
FIG. 2 shows a high-level block diagram of a multimedia messaging system in accordance with one embodiment of the invention.

The communications system 10 also includes a packet-switched network 24. A packet-switched network is one in which relatively small units of data called packets are routed through a network based on the destination address contained within each packet. In one embodiment, the packet-switched network 24 includes a multimedia messaging service (MMS) system 28 that facilitates the exchange of text, video, audio and graphics files between the DAD 16 and destination devices serviced by the MMS system 28. The destination devices may be serviced by the same wireless network, a different wireless network, a wired network, or a computer network. The components of the MMS system can be seen in FIG. 2 of the drawings. The MMS system 28 includes a packet data messaging service center to store and manage the packet data messages exchanged with the DAD 16 and other devices. In the embodiment shown in FIG. 2 of the drawings, the packet data message service center comprises a multimedia messaging service center (MMSC) 30 to store and manage the multimedia messages. The MMSC 30 includes a MMS server 32 and a MMS relay 34. In some embodiments, other equipment such as servers, networks, and storage may be connected to the MMSC 30. The functions and operations of the blocks described in FIG. 1 may be implemented in a number of devices, circuits, or infrastructure. Further, a number of the functional blocks may be integrated in a single device and the functions described as performed in any single device may be implemented over several devices. For example, the communications link 20 between the base station 18 and the MMSC 28 may includes other distinct origination network 12 elements not shown in FIG. 1 such as a base station controller (BSC) and a packet data access gateway switching node (PDSN).

As noted above, the MMS system 28 routes MMS messages from the DAD 16 to one or more destination devices. In FIG. 1, the destination devices are indicated generally by reference numeral 40 and include a user storage device (USD) and two mobile stations designated MS1 and MS2, respectively. As used herein, a user storage device includes any type of device that includes a memory that serves as a final storage location for content. By way of example, a user storage device may be a desktop PC. The mobile stations MS1 and MS2 represent any mobile device that is able to support communications with the MMSC 30 using the MMS protocol. Thus, the mobile stations may be mobile telephones, in one embodiment.

In the exemplary system shown in FIG. 1, the destination devices 40 are connected to the origination network 12 through the destination network 14. In some situations, however, the destination network 14 and the origination network 12 may be the same network. The communication networks 12, 14 may include any number of wireless, wired, computer, Internet, or Intranet networks.

Figure 3:
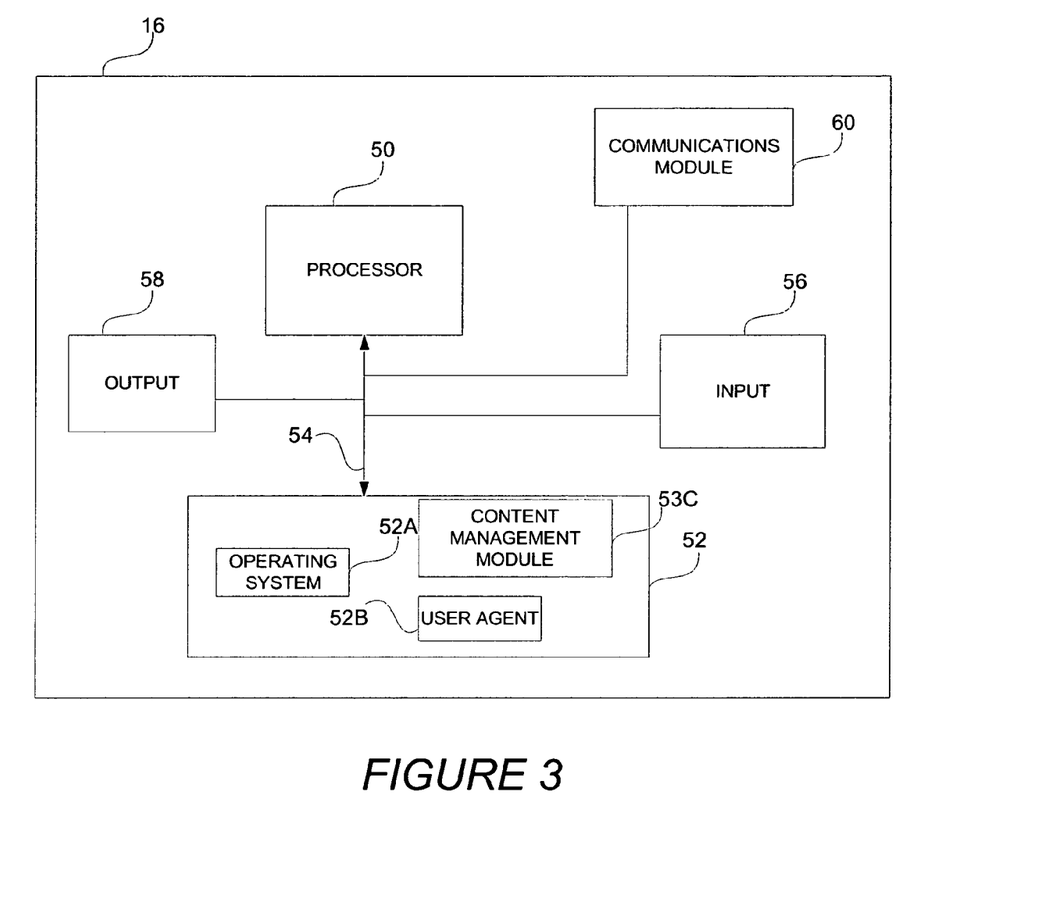
FIG. 3 shows high-level block diagram of a data acquisition device (DAD), in accordance with one embodiment of the invention.

FIG. 3 of the drawings shows a high-level block diagram of the DAD 16, in accordance with one embodiment of the invention. As will be seen, the DAD 16 includes a microprocessor 50, which is coupled to a memory 52 via a communications path 54. The DAD 16 also includes an input mechanism 66 and an output mechanism 58. According to different embodiments, the input mechanism 56 may comprise a keypad and/or a touch screen. The output mechanism 58 may comprise a display screen. Also coupled to the processor 50 is a communications module 60 which includes circuitry to enable the DAD 16 to communicate with the destination devices 40 or with the server 26. The memory 52 may represent various memory technologies such as random access memory (RAM) devices, read only memory (ROM) devices, cache memory devices, etc. The memory devices that make up the memory module 352 may, in some embodiments, reside physically within other components of the DAD 16, e.g., within the processor 50.

As will be understood by one skilled in the art, the memory 52 includes software components to enable operation of the DAD 16. Thus, for example, the memory 52 includes an operating system 52A, which provides an interface to the components of the DAD 16 to various application programs/software that run on the DAD 34. In accordance with one embodiment of the invention, the software includes a User Agent (UA) 52B to view web pages, and content management module 52C that enable the DAD 16 to upload and share digital content as will be described.

Figure 4:
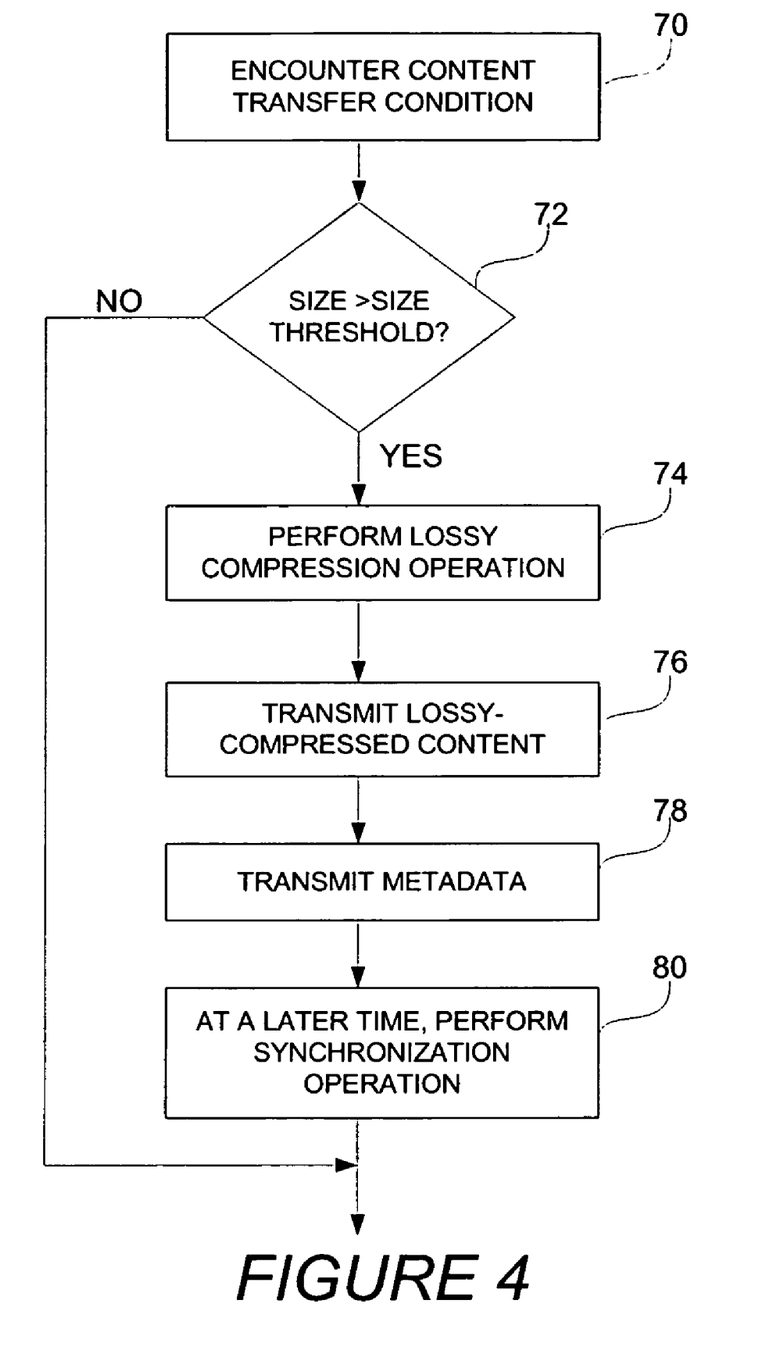
FIG. 4 shows a flowchart of operations performed by the DAD of FIG. 3, in accordance with one embodiment of the invention.

Turning now to FIG. 4 of the drawings, there is shown a flowchart for a content sharing technique performed by the content management module 52C, in accordance with one embodiment. As will be seen, at block 70 a content transfer condition is encountered. In one embodiment, the content transfer condition may be the acquisition or generation of new content. For example, if the DAD 16 is a camera-equipped mobile phone, then the content transfer condition may be the generation or capture of a new image with the camera. By way of another example, the content transfer condition may occur when a user browses a store of existing content and selects a "content share" button to indicate that selected stored content is to be shared. Upon encountering the content transfer condition, control passes to block 72. At block 72, it is determined if a size of the content exceeds a certain size threshold. In one embodiment, the size threshold is carrier dependent and is set to be the maximum size that a particular carrier will allow for a MMS message. In one embodiment the size threshold may be between 100 to 350 kb. At block 74, for content that exceeds that size threshold, the content management module 52C performs a lossy compression operation using conventional lossy compression techniques. The goal of the lossy compression operation is to reduce the size of the content. For example, the content may be 2 megapixel image. After lossy compression the image may be reduced to a 640× 480 megapixel image. At block 76, the lossy compressed content is transmitted to a predefined destination. In one embodiment, the predefined destination is the CMS server 24. The lossy compressed content is sent to the CMS server 24 over the packet-switched network 26, as opposed to over the OTA network 22. Thus, the higher transmission charges for using the OTA network 22 are avoided. In one embodiment, the lossy-compressed content is sent as a MMS message to the server 22 via the MMSC 28. At block 78, the DAD 16 transmits metadata to the CMS server 24. The metadata is transmitted over the packet-switched network 26 as a MMS message. The term "metadata" refers to any parameters or information that controls how the CMS server 24 is to process the content. For example, the metadata may include organizational information for the content. The organizational information specifies the categories to be associated with the content by the CMS server 22, as is described more fully in U.S. Ser. No. 11/302,566. The metadata may also include a device identifier for the USD that defines the final storage location for the content. In one embodiment, the metadata may also include the phone numbers and/or names of selected invitees with whom the content is to be shared. At a later time, at block 80, the DAD 16 performs a synchronization operation to synchronize the content with the final storage location, as will be described later.

Figure 5:
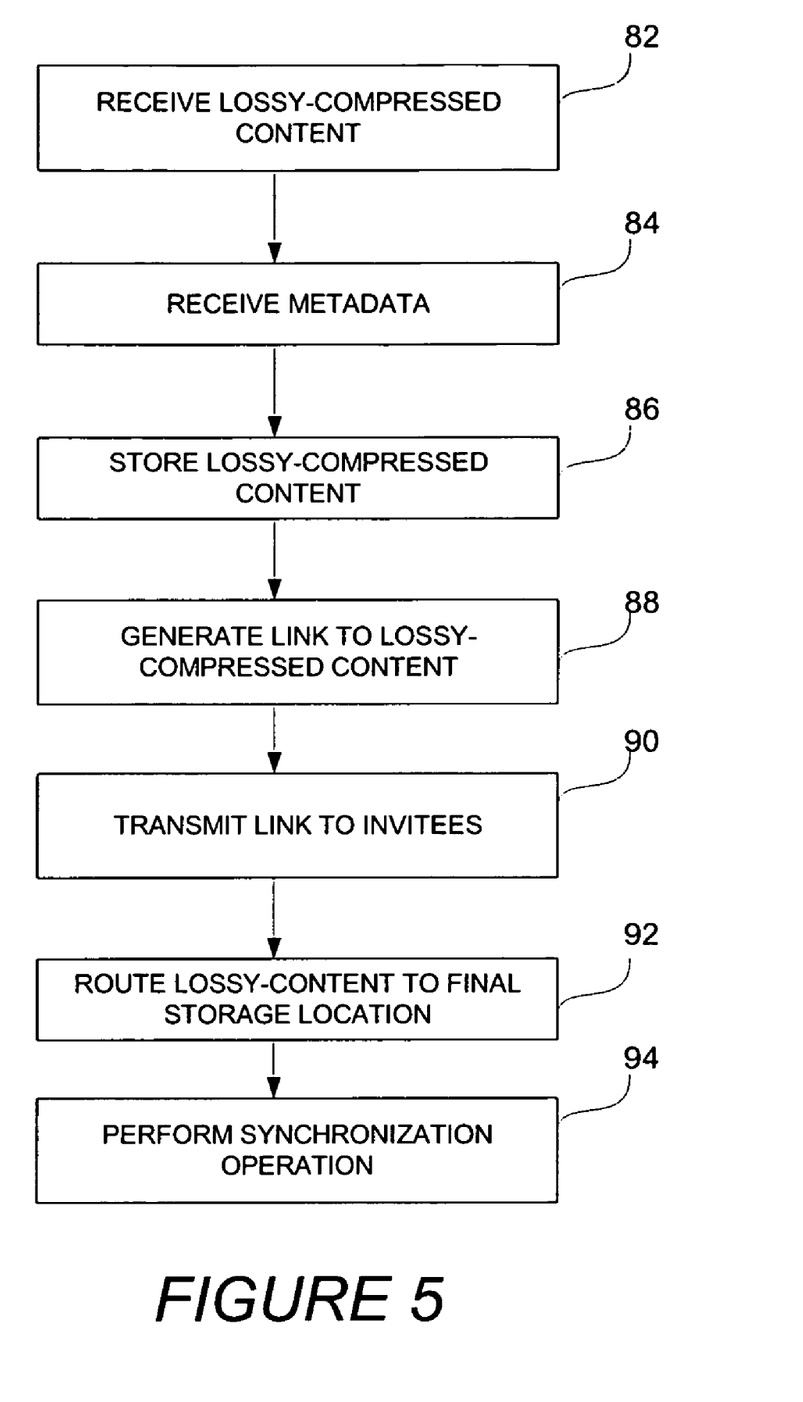
FIG. 5 shows a flowchart of operations performed by a Content Management Service (CMS), in accordance with one embodiment of the invention.

FIG. 5 of the drawings shows a flowchart of operations performed by the CMS server 24, in accordance with one embodiment of the invention. As will be seen, at block 82, the CMS server receives the lossy content from the DAD 16, packet-switched message such as a MMS message from the MMSC 28. At block 84, the CMS server 24 receives the metadata from the DAD 16. It is to be understood that it is possible for the lossy-content and the metadata to be packaged together in the same MMS message. Thus, the metadata that is received at block 84 may be part of the same message that included the lossy-content. In response to receiving the lossy-content and the metadata, the CMS server 24 stores the lossy-content in a memory. Additionally, the CMS server 24 associates one or more categories with the content based on the metadata. At block 88, the CMS server generates an encrypted link to the stored lossy-content. At block 90, the encrypted link is transmitted to selected invitees based on the metadata. For example, the selected invitees may be identified in the metadata by device identifiers for the destination devices MS1 and MS2, in which case, the CMS server 24 would send the encrypted link to the devices MS1 and MS2 at block 90. The encrypted link may be used by the devices MS1 and MS2 to retrieve the lossy-content from the CMS server 24. The encrypted link may be sent to the selected invitees as a MMS message. Various protocols, signaling schemes, and formats may be used to send the MMS message to the destination devices 40. For example, the MMSC 28 may generate and transmit a MMS notification message to the destination device 40 using a Wireless Application Protocol (WAP) "Push" procedure over Short Message Service (SMS). The MMS notification message contains a URL pointer to the dynamically generated MMS message including the lossy-content. After receiving the MMS notification message, the destination device 40 initiates a data connection that provides TCP/IP network connectivity. The destination device may perform an HTTP (or WSP) "get" procedure to retrieve the MMS message from the MMSC 28. In one embodiment, the MMS message may be transmitted using one of several messaging protocols. Examples of suitable protocols include M-IMAP, OMA-MM1, and SIP-based MM1. In addition, email protocols such as IMAP and POP can be used in some circumstances.

At block 92, the CMS server 24 routes the lossy-content to the final storage location indicated in the metadata. For example, the metadata may indicate a device identifier for the USD of FIG. 1 as the final storage location. In this case the CMS server 24 will route the lossy-content to the USD of FIG. 1 using the above-described techniques. At block 94, the CMS server performs a synchronization operation with the DAD 16, as will now be described with reference to FIG. 6 of the drawings.

Figure 6:
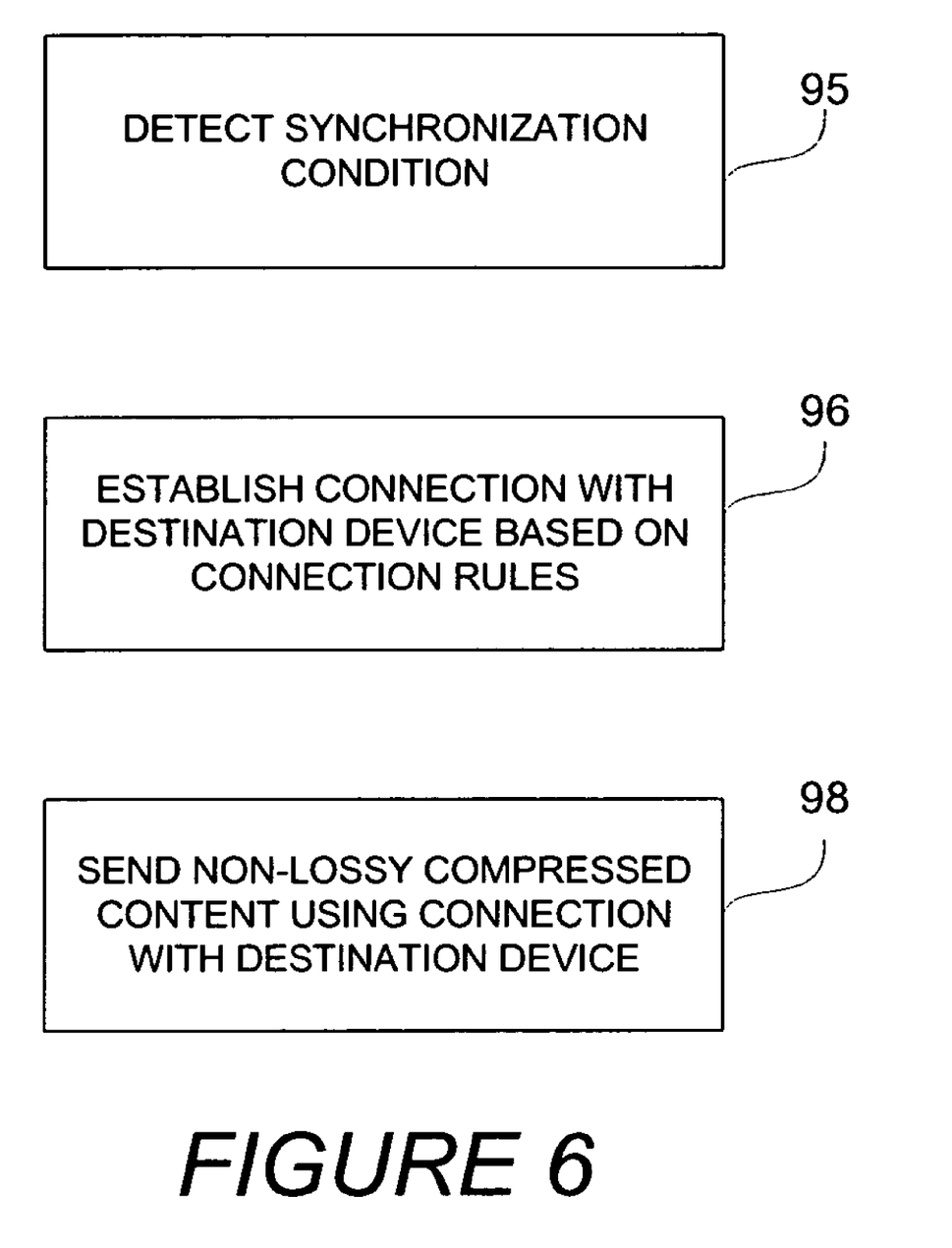
FIG. 6 shows a flowchart for a synchronization operation.

FIG. 6 shows a flowchart for a synchronization operation performed by the DAD 16, in accordance with one embodiment of the invention. As will be seen, at block 95, the DAD 16 detects a synchronization condition. In one embodiment the synchronization condition may be user-defined. The synchronization condition specifies or controls under what conditions the lossy-compressed image that was sent to the CMS server 24 via a MMS message, as described is to be synchronized by sending the corresponding full or non-lossy compressed content to the final storage location. For example, in one embodiment, the synchronization condition may specify that only if the DAD 16 is within its home network (i.e. the DAD 16 is not in a roaming network) is synchronization to be performed via an OTA link using the OTA network 22. The rationale here is that the OTA link is established within the DAD's home network and thus the OTA data charges should be less that if the DAD were roaming. Another example of a synchronization condition is the detection of a wireless local area network (WLAN). In some cases the synchronization condition may be the detection of the user storage location itself, for example through a Bluetooth channel. At block 96, the DAD 16 establishes a connection with the destination device for purposes of transferring the non-lossy compressed data to the destination device. In accordance with different embodiments, the connection may an OTA connection within the DADs local network, a WLAN connection. e.g. a Wi-Fi connection, or a Bluetooth connection. The destination device may be the CMS server 14, or the USD that defines the final storage location. At block 98, the DAD 16 sends that non-lossy compressed content to the destination device using the connection with the destination device. If the destination is the CMS server 24, then the CMS server receives the non-lossy content (at block 94 in FIG. 5). The CMS server saves the non-lossy content and notifies the USD that defines the final storage location e.g. by the WAP push method. The USD can then pull the non-lossy content from the CMS server 24. In one embodiment, the lossy-compressed content is replaced with the non-lossy content. Therefore, there has to be a mechanism to determine the lossy-content that the non-lossy content is intended to replace. In one embodiment, the DAD 16 generates an identifier for the lossy-content which it sends to the CMS server 24 as part of the metadata. When the lossy-content is stored on the CMS server or on the USD, the identifier for the lossy-content is associated with the lossy-content, e.g., via a table. When send the non-lossy content, as described above, the DAD 16 also sends the identifier for the lossy-content. This identifier can then be used by the CMS server and/or the USD to identify the lossy-content that is to be replaced with the non-lossy content.

Figure 7:
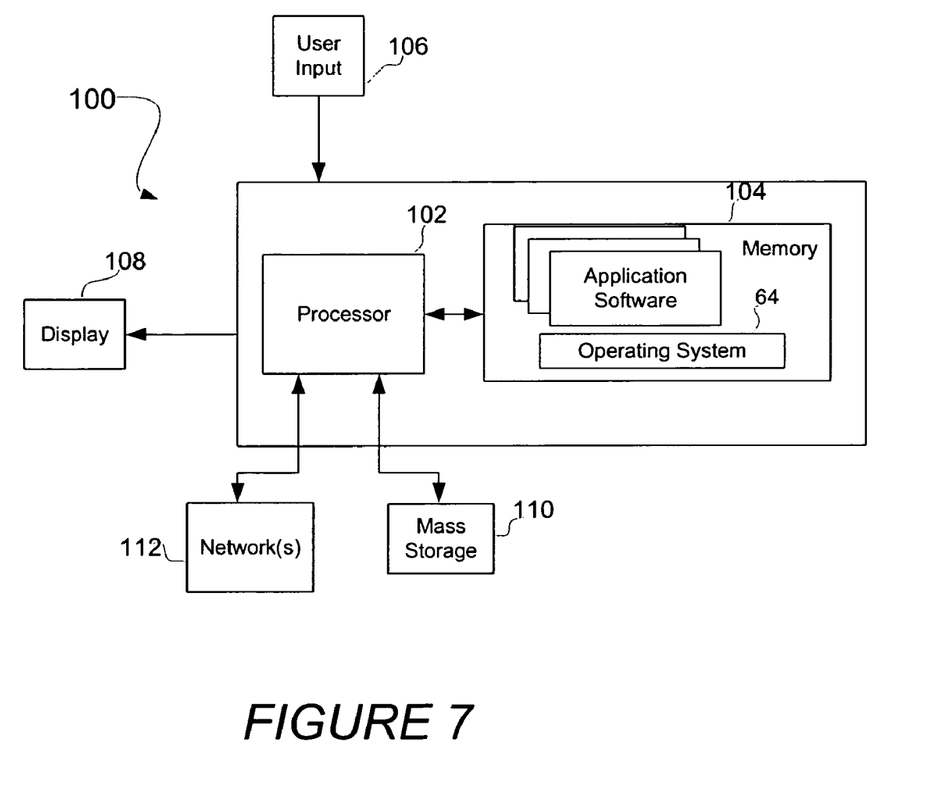
FIG. 7 shows a high-level block diagram of hardware that for a server that may be used to implement the Content Management Service (CMS), in accordance with one embodiment of the invention.

FIG. 7 of the drawings shows an example of hardware 100 that may be used to implement the CMC server 24 in accordance with one embodiment of the invention. The hardware 100 typically includes at least one processor 102 coupled to a memory 104. The processor 102 may represent one or more processors (e.g., microprocessors), and the memory 104 may represent random access memory (RAM) devices comprising a main storage of the hardware 100, as well as any supplemental levels of memory e.g., cache memories, non-volatile or back-up memories (e.g. programmable or flash memories), read-only memories, etc. In addition, the memory 104 may be considered to include memory storage physically located elsewhere in the hardware 100, e.g. any cache memory in the processor 102 as well as any storage capacity used as a virtual memory, e.g., as stored on a mass storage device 110.

The hardware 100 also typically receives a number of inputs and outputs for communicating information externally. For interface with a user or operator, the hardware 100 may include one or more user input devices 106 (e.g., a keyboard, a mouse, etc.) and a display 108 (e.g., a Liquid Crystal Display (LCD) panel). For additional storage, the hardware 100 may also include one or more mass storage devices 110, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 100 may include an interface with one or more networks 112 (e.g., a local area network (LAN), a wide area network (WAN), a wireless network, and/or the Internet among others) to permit the communication of information with other computers coupled to the networks. It should be appreciated that the hardware 100 typically includes suitable analog and/or digital interfaces between the processor 102 and each of the components 104, 106, 108 and 112 as is well known in the art.

The hardware 100 operates under the control of an operating system 104, and executes various computer software applications, components, programs, objects, modules, etc. that define the Content Management Service (CMC) described above. Moreover, various applications, components, programs, objects, etc. may also execute on one or more processors in another computer coupled to the hardware 100 via a network 112, e.g. in a distributed computing environment, whereby the processing required to implement the functions of a computer program may be allocated to multiple computers over a network. In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure or the scope of the accompanying claims.

The invention claimed is:

1. A method for a data acquisition device, the data acquisition device enabled to communicate over an over-the-air (OTA) network and enabled to communicate over a packet switched network, the method comprising:
   the data acquisition device storing content for transmission to a final storage location;
   upon encountering a content transfer condition, determining that a size of the content is greater than a predefined size threshold;
   upon determining that the size of content is greater than the predefined size threshold, performing a lossy compression operation on the content to reduce the size of the content to produce a lossy-compressed content;
   transmitting the lossy-compressed content, using a packet-switched networking protocol and without transmitting the lossy-compressed content over an OTA network, to a predefined destination for routing to a final storage location; and
   at a later time, performing a synchronization operation wherein the data acquisition device transmits the content to the final storage location to replace the lossy-compressed content previously transmitted using the packet-switched networking protocol with the content.

2. The method of claim 1, wherein the packet-switched networking protocol comprises the multimedia messaging protocol (MMS) and the predefined size threshold is a maximum size a carrier allows for an MMS message.

3. The method of claim 1, further comprising transmitting metadata to the predefined destination via the packet-switched networking protocol to facilitate processing of the lossy-compressed content at the predefined location.

4. The method of claim 3, wherein the metadata is selected from the group consisting of an identifier for the final storage location, category information to facilitate categorization of the lossy-compressed content; and invitee information.

5. The method of claim 1, wherein the predefined destination comprises a server for an online content management service.

6. The method of claim 1, wherein the data acquisition device performs the synchronization upon detection of a synchronization condition.

7. The method of claim 6, wherein the synchronization condition comprises the presence of a local OTA network.

8. The method of claim 7, wherein the synchronization condition comprises the establishment of a non-OTA connection with the final storage location.

9. The method of claim 8, wherein the non-OTA connection is selected from the group consisting of a Wi-Fi connection, and a Bluetooth connection.

10. A method, comprising:
receiving lossy-compressed content from a data acquisition device using a packet-switched networking protocol;
receiving metadata associated with the lossy-compressed content from the data acquisition device;
storing the lossy-compressed content;
routing the lossy-compressed content to the lossy-compressed content's final storage location based on the metadata;
generating an encrypted link to the stored lossy-compressed content;
transmitting the encrypted link to the lossy-compressed content to selected invitees based on the metadata; and
performing a synchronization operation wherein content corresponding to the lossy-compressed content is received from the data acquisition device to replace the lossy-compressed content and wherein the content is received from the data acquisition device through a transmission protocol different from the packet-switched networking protocol used to receive the lossy-compressed content.

11. The method of claim 10, wherein for the synchronization operation, the content is received using an over-the air data connection with the data acquisition device established when the data acquisition device in within a local network.

12. The method of claim 11, wherein the synchronization operation comprises sending the content to the final storage location.

13. A data acquisition device, comprising:
a processor; and
a memory coupled to the processor, the memory storing instructions which when executed by the processor causes the data acquisition device to perform the method of claim 1.

14. The data acquisition device of claim 13, wherein the packet-switched networking protocol comprises the multimedia messaging protocol (MMS) and the predefined size threshold is a maximum size a carrier allows for an MMS message.

15. The data acquisition device of claim 13, wherein the method further comprises transmitting metadata to the predefined destination to facilitate processing of the lossy-compressed content at the predefined location.

16. The data acquisition device of claim 13, wherein the metadata is selected from the group consisting of an identifier for the final storage location, category information to facilitate categorization of the lossy-compressed content; and invitee information.

17. The data acquisition device of claim 13, wherein the synchronization is performed upon detection of a synchronization condition.

18. A server device, comprising
a processor; and
a memory coupled to the processor, the memory storing instructions which when executed by the processor, cause the processor to perform the method of claim 10.

19. The server device of claim 18, wherein for the synchronization operation, the content is received using an over-the air data connection with the data acquisition device established when the data acquisition device is within a local network.

20. The server device of claim 19, wherein the synchronization operation comprises sending the content to the final storage location.

* * * * *